US007929956B2

(12) United States Patent
Chuang

(10) Patent No.: US 7,929,956 B2
(45) Date of Patent: Apr. 19, 2011

(54) CALL REJECTING SYSTEM AND METHOD OF USING THE SAME

(75) Inventor: Ching-Kuei Chuang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 711 days.

(21) Appl. No.: 11/952,952

(22) Filed: Dec. 7, 2007

(65) Prior Publication Data

US 2009/0011749 A1    Jan. 8, 2009

(30) Foreign Application Priority Data

Jul. 6, 2007 (TW) ................ 96124618 A

(51) Int. Cl.
H04M 3/42 (2006.01)
H04K 3/00 (2006.01)
(52) U.S. Cl. .................. 455/415; 379/210.03
(58) Field of Classification Search ............... 455/414.1, 455/415, 565; 379/120, 210.02, 210.03
See application file for complete search history.

(56) References Cited

U.S. PATENT DOCUMENTS

2001/0016485 A1 * 8/2001 Bok ............... 455/411

FOREIGN PATENT DOCUMENTS

KR    1020040031981    *    4/2004

* cited by examiner

Primary Examiner — Lee Nguyen
(74) Attorney, Agent, or Firm — Jeffrey T. Knapp

(57) ABSTRACT

A call rejecting system (100) includes a base station (10) and a mobile terminal (20). The base station includes a controlling module (11), a storage module (12) and a comparing module (13). The controlling module is electronically connected to the storage module and the comparing module. The mobile terminal sends prohibited phone numbers to the base station. The prohibited phone numbers is stored in the storage module. When the base station receives a call signal calling the mobile terminal, the comparing module compares the number of the call signal with the prohibited phone numbers sent by the mobile terminal. The controlling module rejects the call signal or transmits the call signal to the mobile terminal according to the result of comparison.

11 Claims, 2 Drawing Sheets

CALL REJECTING SYSTEM AND METHOD OF USING THE SAME

BACKGROUND OF THE INVENTION

1. Field of the Invention

The present invention relates to call rejecting systems and rejecting methods for wireless communication devices and, particularly, to a call rejecting system and a rejecting method that uses less memory and increase processing speed of wireless communication devices.

2. Description of Related Art

Nowadays, many wireless communication devices, such as mobile phones and laptops having the function of setting some prohibited phone numbers and automatically rejecting calls coming from the prohibited phone numbers. A user can set and store prohibited phone numbers in a wireless communication device. When the wireless communication device receives a call, the wireless communication device automatically compares the number of the call with the stored prohibited phone numbers before ringing or vibrating to remind the user. If the number of the call is different from any of the stored prohibited phone numbers, the wireless communication device rings or vibrates to remind the user. On the contrary, if the number of the call is same as any of the stored prohibited phone numbers, the wireless communication device automatically hangs up the call without ringing or vibrating, and then displays corresponding message of the call to tell the user via ringing or vibrating.

However, most wireless communication devices generally have not enough memory to store a great number of prohibited phone numbers. Furthermore, when the software for setting prohibited phone numbers and rejecting calls coming from the prohibited phone numbers is installed and running in a wireless communication device, the memory of the wireless communication device is occupied. Thus, processing speed of the wireless communication device is decreased, and operation of the wireless communication device is disturbed.

Therefore, a new call rejecting system and a new call rejecting method are desired in order to overcome the above-described shortcomings.

SUMMARY

In one aspect, a call rejecting system includes a base station and a mobile terminal. The base station includes a controlling module, a storage module and a comparing module. The controlling module is electronically connected to the storage module and the comparing module. The mobile terminal sends prohibited phone numbers to the base station. The prohibited phone numbers is stored in the storage module. When the base station receives a call calling the mobile terminal, the comparing module compares the incoming phone number of the call with the prohibited phone numbers sent by the mobile terminal. Then, controlling module determine whether to reject or transmit the call to the mobile terminal according to the result of comparison.

In another aspect, A call rejecting method, comprising these steps: providing a call rejecting system, the call rejecting system including a base station and a mobile terminal; setting prohibited phone numbers; sending the prohibited phone numbers to the base station; storing prohibited phone numbers in the base station; receiving a call calling the mobile terminal via the base station; comparing the incoming phone number of the call with the stored prohibited phone numbers via the base station; and rejecting or transmitting the call to the mobile terminal according to the result of comparison via the base station.

Other advantages and novel features will become more apparent from the following detailed description when taken in conjunction with the accompanying drawings.

BRIEF DESCRIPTION OF THE DRAWINGS

Many aspects of the present call rejecting system and method can be better understood with reference to the following drawings. The components in the various drawings are not necessarily drawn to scale, the emphasis instead being placed upon clearly illustrating the principles of the present call rejecting system and method. Moreover, in the drawings, like reference numerals designate corresponding parts throughout the diagrams.

DETAILED DESCRIPTION OF THE INVENTION

Figure 1:
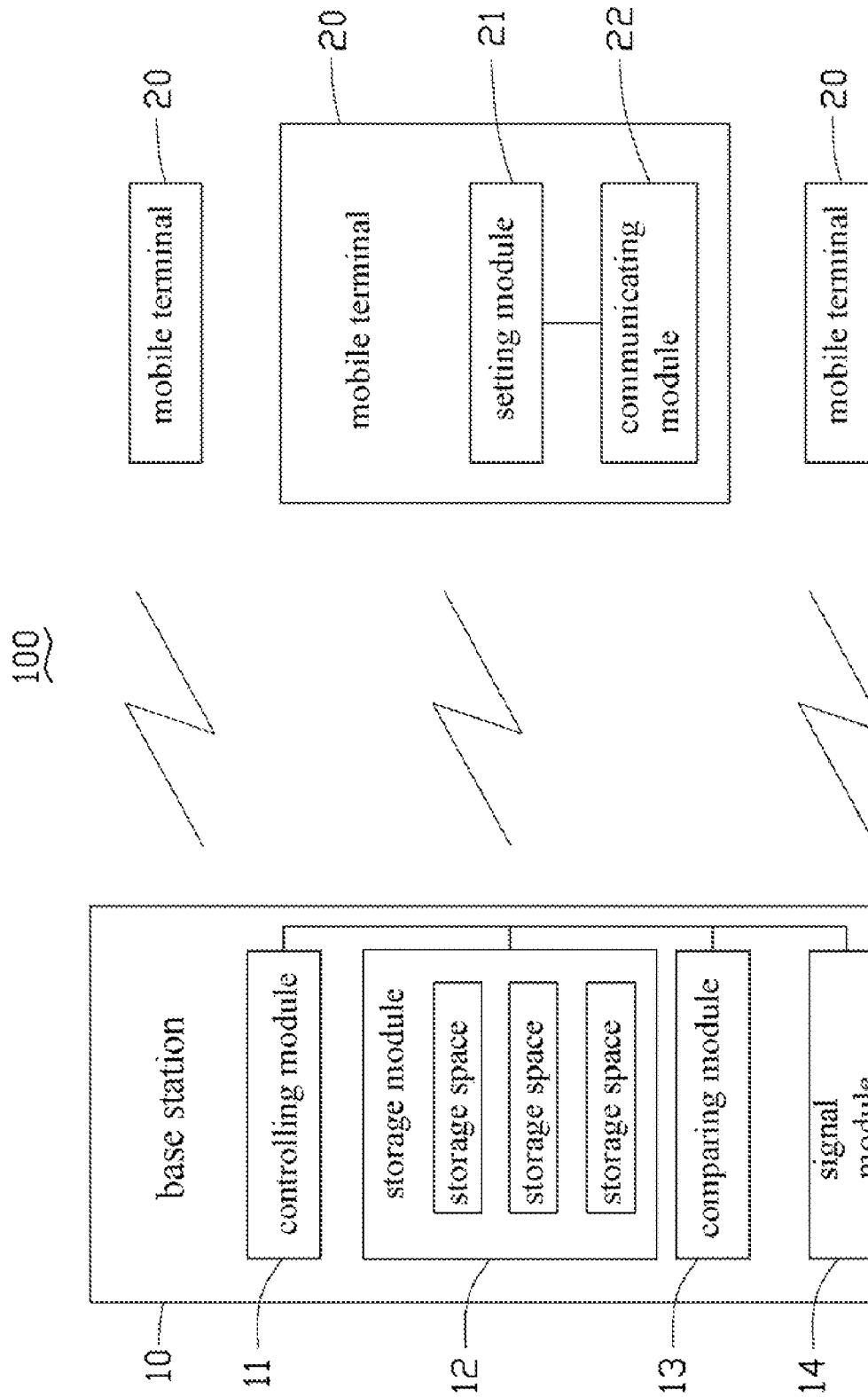
FIG. 1 is a diagram of a call rejecting system, in accordance with a present embodiment.

Referring now to the drawings in detail, FIG. 1 shows a call rejecting system 100, in accordance with a present embodiment. The call rejecting system 100 includes a base station 10 and a plurality of mobile terminals 20. Each mobile terminal 20 is a wireless communicating device having a wireless communicating function, such as a mobile phone or a laptop, etc.

The base station 10 can be combined with a typical base station of cell phone and includes a controlling module 11, a storage module 12, a comparing module 13 and a signal module 14. The controlling module 11 is a processor electronically connected to the storage module 12, the comparing module 13 and the signal module 14. The controlling module 11 controls the storage module 12, the comparing module 13 and the signal module 14 to cooperate with each other, and determines whether a call received by the base station 10 should be rejected. The storage module 12 is a memory for storing prohibited phone numbers set by the user of each mobile terminal 20. The comparing module 13 is a processor configured to compare call numbers received by the base station 10 with the stored prohibited phone numbers. The signal module 14 is configured for receiving prohibited phone numbers sent from each mobile terminal 20 and call signals searching each mobile terminal 20, and sending a message of a call signal to the corresponding mobile terminal 20 when the call signal is rejected according to the prohibited phone numbers.

Each mobile terminal 20 includes a setting module 21 and a communicating module 22. The setting module 21 is configured for setting prohibited phone numbers with the ability to combined with the typical components of the mobile terminal 20, such as the keypads. The communicating module 22 is configured for sending the set prohibited phone numbers to the base station 10, and receiving the message of a call signal coming from the base station 10 when the call signal is rejected according to the prohibited phone numbers. The communicating module 22 can be combined with the typical components of the mobile terminal 20, such as the antenna.

Figure 2:
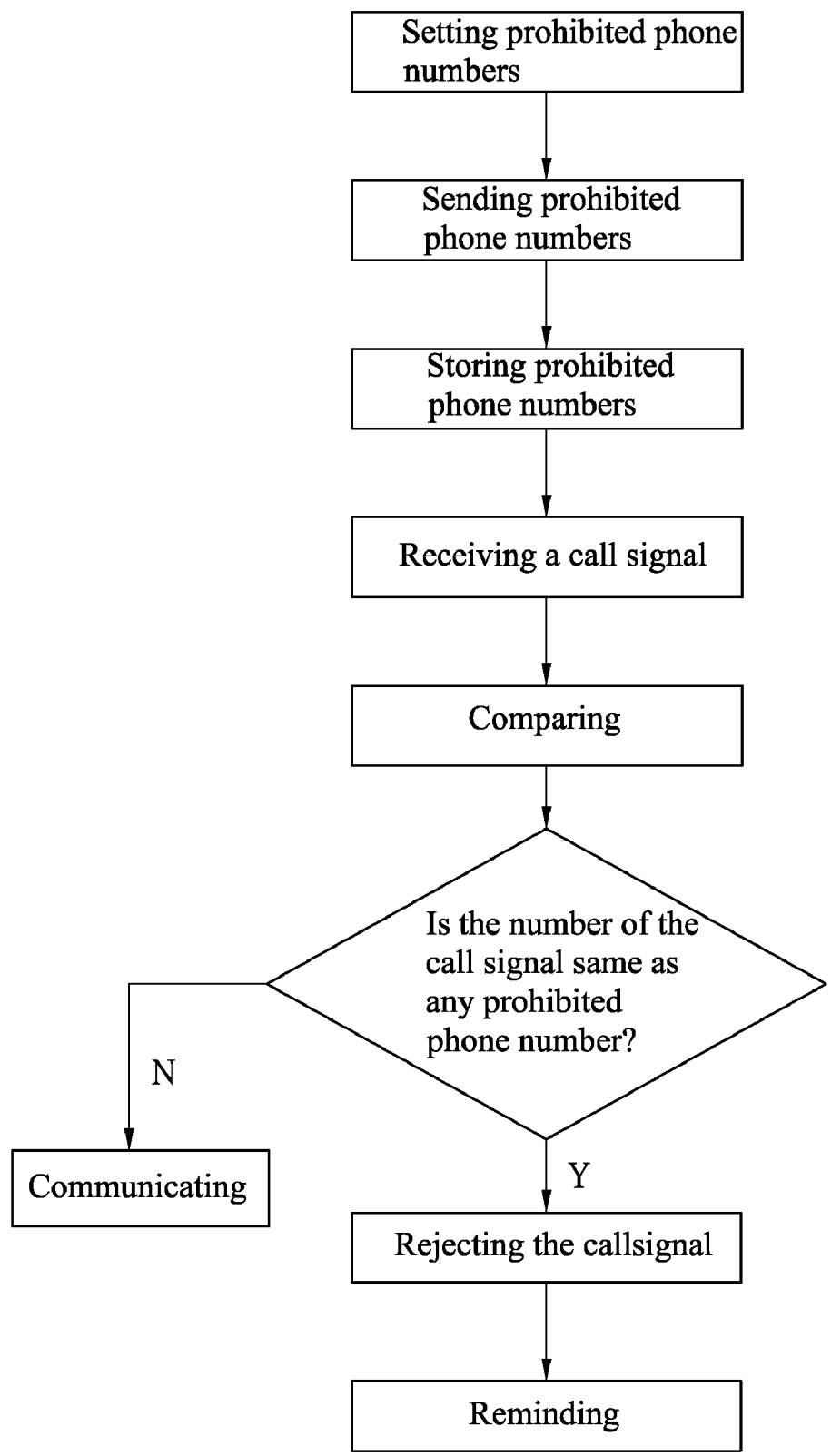
FIG. 2 is a flow chart of a call rejecting method, in accordance with a present embodiment.

Referring to FIG. 2, a call rejecting method in accordance with a present embodiment is provided. The call rejecting method essentially uses the aforementioned call rejecting system 100 to process call signals for the mobile terminals 20, and determine whether a call signal should be rejected according to the processing results. The call rejecting method includes these steps as follows.

An aforementioned call rejecting system 100 is provided.

Prohibited phone numbers of each mobile terminal 20 are set in the mobile terminal 20 via its setting module 21.

The prohibited phone numbers of each mobile terminal 20 are sent to the signal module 14 via the communicating module 22 of the mobile terminal 20.

A plurality of storage spaces corresponding to the plurality of mobile terminals 20 is set in the storage module 12 via the controlling module 11. The prohibited phone numbers sent by each mobile terminal 20 are stored in the storage space corresponding to the mobile terminal 20.

When calling a mobile terminal 20, the call signal is first received by the signal module 14 of the base station 10. The controlling module 11 inquires the storage space corresponding to the mobile terminal 20 in the storage module 12. The comparing module 13 compares the number of the call signal with the prohibited phone numbers stored in the store space. If the number of the call signal is similar to any of the prohibited phone numbers stored in the storage space corresponding to the mobile terminal 20 in the storage module 12, the controlling module 11 automatically rejects the call signal, thus the call signal cannot be received by the mobile terminal 20. At the same time, the controlling module 11 can control the signal module 14 to send a message to the mobile terminal 20 for reminding the user. On the contrary, if the number of the call signal is not similar to any of the prohibited phone numbers stored in the storage space corresponding to the mobile terminal 20 in the storage module 12, the controlling module 11 transmits the call signal to the mobile terminal 10, and the mobile terminal 20 communicates with the number of the call signal normally.

Understandably, in the call rejecting system 100 of the present embodiment, the prohibited phone number are not stored in the memory of the mobile terminals 20 but in the storage module 12 of the base station 10, thus the mobile terminals 20 has more storing capability. The step of comparing the phone number of the call signals with the prohibited phone numbers is processed by the base station 10, thus the memory of the mobile terminals 20 is prevented from being occupied. In this way, the rate of processing data of the mobile terminals 20 can be increased.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A call rejecting system, comprising:
    a base station, the base station including a controlling module, a storage module, a signal module, and a comparing module, the controlling module being electronically connected to the signal module, the storage module and the comparing module; and
    a mobile terminal, the mobile terminal sending prohibited phone numbers to the base station; the prohibited phone numbers being received by the signal module and being stored in the storage module; when the signal module receives a call signal calling the mobile terminal, the comparing module comparing the number of the call signal with the prohibited phone numbers sent by the mobile terminal, the controlling module rejecting the call signal or transmitting the call signal to the mobile terminal according to the result of comparison, and the signal module sending a message of the calling signal to the terminal when the call signal is rejected.

2. The call rejecting system as claimed in claim 1, wherein the mobile terminal includes a setting module which is configured for setting prohibited phone numbers.

3. The call rejecting system as claimed in claim 1, wherein the mobile terminal includes a communicating module which is configured for sending the set prohibited phone numbers to the base station, and receiving the message of a call signal coming from the base station when the call signal is rejected.

4. The call rejecting system as claimed in claim 1, wherein the controlling module rejects a call signal when the number of the call signal is similar to any of the prohibited phone numbers sent by the called mobile terminal.

5. The call rejecting system as claimed in claim 1, wherein the controlling module transmits a call signal to the mobile terminal when the number of the call signal is not similar to any of the prohibited phone numbers sent by the called mobile terminal.

6. The call rejecting system as claimed in claim 1, further comprising a plurality of mobile terminals.

7. A call rejecting method, comprising steps of:
    providing a call rejecting system, the call rejecting system including a base station and a mobile terminal;
    setting prohibited phone numbers;
    sending the prohibited phone numbers to the base station;
    storing the prohibited phone numbers in the base station;
    receiving a call signal calling the mobile terminal via the base station;
    comparing the number of the call signal with the stored prohibited phone numbers via the base station;
    rejecting the call signal or transmitting the call signal to the mobile terminal according to the result of comparison via the base station; and
    sending a message of the call signal to the mobile terminal when the call signal is rejected.

8. The call rejecting method as claimed in claim 7, wherein the call rejecting system includes a plurality of mobile terminals.

9. The call rejecting method as claimed in claim 8, further comprising a step of setting a plurality of storage spaces corresponding to the plurality of mobile terminals in the base station, and storing the prohibited phone numbers sent by each mobile terminal in the storage space corresponding to the mobile terminal.

10. The call rejecting method as claimed in claim 9, further comprising a step of inquiring the storage space corresponding to a mobile terminal in the storage module when the mobile terminal being called, and comparing the number of the call signal with the prohibited phone numbers stored in the store space.

11. The call rejecting method as claimed in claim 7, further comprising a step of rejecting a call signal when the number of the call signal is similar to any of the prohibited phone numbers sent by the called mobile terminal.

* * * * *